United States Patent Office 3,775,361
Patented Nov. 27, 1973

3,775,361
PREPARATION OF STABLE CONCENTRATED SOLUTIONS OF AROMATIC NITROGEN-LINKED CONDENSATION POLYMERS
James Henry Jensen, Wilmington, Del., assignor to E. I. du Pont de Nemours and Company, Wilmington, Del.
No Drawing. Filed Oct. 21, 1971, Ser. No. 191,482
Int. Cl. C08g 20/00, 51/44
U.S. Cl. 260—32.6 NA
4 Claims

ABSTRACT OF THE DISCLOSURE

Solutions of aromatic nitrogen-linked condensation polymers such as polyamides and polyhydrazides are prepared by filtering a mixture of the polymer, a polar solvent, and a partially soluble chloride salt of a volatile nitrogenous base to remove the insoluble portion of the salt, adding a sufficient amount of a non-volatile inorganic base which forms a soluble chloride salt for conversion of the soluble portion of the salt of the volatile nitrogenous base and any remaining acidity of the solution to inorganic salts, followed by substantially complete removal from the mixture of the volatile nitrogenous base. The resultant solutions possess good stability of viscosity during exposure to the temperatures involved in concentration of the solution and in dry-spinning fibers from the solutions.

BACKGROUND OF THE INVENTION

(1) Field of the invention

This invention pertains to an improved process for preparing solutions of aromatic nitrogen-linked condensation polymers in organic solvents. More particularly, it is directed to the preparation of such solutions which contain soluble chloride salts and are substantially free of acidic materials and of salts of volatile nitrogenous bases and therefore have good stability toward viscosity changes during exposure to elevated temperatures such as are involved in the concentration of such solutions and in the dry-spinning of fibers and the extrusion of films.

(2) Description of the prior art

Processes for spinning fibers and extruding films from aromatic nitrogen-linked condensation polymers are well-known. Because of the very high melting points of these polymers, they are spun as fibers and extruded as films from solutions by either wet processes, in which a solution of the polymer is extruded into a liquid coagulating bath, or by dry processes, in which a solution of the polymer is extruded into a gas-filled cell in which a part of the solvent evaporates and the polymer solution cools. Fibers and films made by both techniques are usually extracted to remove residual solvent and other soluble components of the spinning solution and may be drawn, heated, or otherwise processed to improve their properties for particular end uses.

Polymer solutions must have several properties to be practically useful for fiber spinning and extrusion. For example, they must have a spinnable or extrudable viscosity at some practical spinning or extruding temperature, they must be free of solid matter which plugs spinning or extruding equipment, and they must also be non-corrosive toward processing equipment. To be useful in dry-spinning processes, they must be sufficiently stable at the temperatures involved in continuous processes for the production of fibers of uniform size and quality. After spinning, evaporating a portion of the solvent, and cooling, solutions for dry-spinning must be sufficiently viscous and non-tacky for further processing and also must be free of matter precipitated during the spinning process which adversely affects the properties of the spun fibers.

Continuous processes which avoid isolation of the polymer are desirable for preparing spinning or extruding solutions of aromatic nitrogen-linked condensation polymers. Such non-isolation processes avoid redissolving the polymer, involve reduced amounts of solvents and other materials, reduce the range of contaminating the polymer, and are economical in other ways.

Aromatic nitrogen-linked condensation polymers are conveniently made by continuous solution condensation processes based on procedures, described for example by Kwolek et al. in U.S. Pat. 3,063,966 and by Frazer in U.S. Pat. 3,130,182, which involve the condensation of a suitable acid chloride with a suitable reactive amino-compound to obtain a solution of the polymer and a large amount of hydrogen chloride in a solvent system which forms a salt or complex with the hydrogen chloride. The development of continuous non-isolation processes for preparing spinning solutions from such reaction mixtures has been complicated by a need to neutralize the hydrogen chloride in order to reduce the corrosivity of the mixture and by a need to remove major amounts of chlorides which would adversely affect the properties of the spun fibers.

Kwolek et al. describe in U.S. Pat. 3,063,966 several techniques useful for neutralizing hydrogen chloride in solutions of aromatic nitrogen-linked condensation polymers, including reaction with suitable basic materials to form soluble or insoluble chloride salts. This patent teaches that large amounts of chloride salts can be readily separated from such mixtures by including in or adding to the polymerization reaction mixture a basic material which forms a relatively insoluble chloride salt which separates and can be filtered or centrifuged from the polymer solution. In a preferred technique, gaseous ammonia is passed into the reaction mixture to form ammonium chloride.

Beste et al. teach in U.S. Pat. 3,068,188 that aromatic polyamides have increased solubility in a specified group of solvents containing salts which dissociate to form chloride or bromide ions and that such solutions are useful for the wet-spinning and dry-spinning of textile fibers. Exemplary is a solution of a condensation polymer of meta-phenylenediamine and isophthaloyl chloride dissolved in dimethylacetamide containing lithium chloride.

Richter et al. teach in U.S. Pat. 3,567,632 processes for making permselective membranes particularly suitable for separating the components of solutions such as water containing dissolved salts. These processes involve forming a "protomembrane" of a solution of, inter alia, an aromatic nitrogen-linked condensation polymer in a solvent containing a dissolved salt and extracting this protomembrane with a rinse medium under conditions which extract the salt. Richter et al. teach procedures for making such membranes in hollow fiber form which include dry-spinning suitable solutions of a broad range of polymers.

In practical experience with the ammonia neutralization non-isolation processes of the type described by Kwolek et al. in U.S. Pat. 3,063,966 for preparing spinning solutions of aromatic nitrogen-linked condensation polymers containing salts of the type described by Beste et al. in U.S. Pat. 3,068,188 and in using these solutions in preparing hollow fiber permselective membranes as described by Richter et al. in U.S. Pat. 3,567,632, it has been found necessary to concentrate the polymer solutions under vacuum to remove sufficient solvent to obtain solutions with viscosities suitable for dry-spinning and with sufficiently high polymer content to produce processable fibers.

It has been found that some polymer solutions change in viscosity upon exposure to the elevated temperatures involved in their concentration and in the dry-spinning of fibers and the extrusion of films to such a degree that products with uniform properties are not obtained. These problems have been particularly observed in the dry-spinning of hollow fibers for conversion to permselective membranes. The causes of the observed changes in viscosity are not completely understood, but are believed to be related to loss of ammonia from the polymer solution during concentration and to a concomitant increase in the acidity of the polymer solution which causes changes in the degree of polymerization of the polymer. It has also been observed occasionally that hollow fibers spun from polymer solutions containing ammonium chloride had porous walls such as would be expected from the formation of gas bubbles during the spinning process, and that sufficient ammonium chloride remains dissolved in the polymer soltuion after filtering to remove the insoluble portions so that additional ammonium chloride precipitates during such concentration and during dry-spinning of the concentrated solutions. The precipitated ammonium chloride plugs the spinning equipment and affects the properties of the hollow fiber membranes obtained.

DESCRIPTION OF THE INVENTION

It has now been discovered that solutions of aromatic nitrogen-linked condensation polymers which are stable toward viscosity changes resulting from exposure to elevated temperatures can be prepared by an improvement in the process which comprises the steps of (A) Preparing a mixture comprising (I) a solution of
(a) a substantially linear aromatic synthetic organic nitrogen-linked polymer of the formula

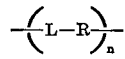

in which
(i) each —L— group as it occurs in the polymer chain is independently a linking group and at least about 50 percent of the linking —L— groups contain nitrogen atoms in the polymer chain;
(ii) each —R— group as it occurs in the polymer chain is independently an organic radical and at least about 50 percent of the organic radical —R— groups consist essentially of a 5-member or a 6-member ring subject to a resonance bonding; and
(iii) the degree of polymerization is defined by $n$, which is an integer sufficiently large to provide film-forming molecular weight, and with the terminal groups undefined; and
(II) a chloride salt of a volatile nitrogenous base a portion of which is soluble and a portion of which is insoluble in the polymer solution;

(B) separating the insoluble portion of the chloride salt from the mixture;

The improvement consisting essentially of the steps of (C) Adding to the filtrate a non-volatile inorganic base, which base forms a chloride salt soluble in a concentrated solution of the polymer in the organic polar solvent, said base being added in an amount sufficient to convert any hydrogen chloride present and the soluble portion of the salt of the volatile nitrogenous base to soluble chloride salts of said inorganic base; and (D) Removing substantially all of the volatile nitrogenous base from the resulting solution.

In a preferred embodiment of this process, the polymer is an aromatic polyamide, the solvent is dimethylacetamide, the volatile nitrogenous base is ammonia, and the non-volatile base is lithium hydroxide. In a particularly preferred embodiment of this process, a mixture containing an aromatic polyamide and ammonium chloride in dimethylacetamide is diluted with dimethylacetamide before filtering to remove ammonium chloride, and an aqueous solution of lithium hydroxide is added before an evaporative concentration which removes substantially all ammonia from the solution.

The process of this invention which includes the addition to a polymer solution containing a chloride salt of a volatile nitrogenous base of a sufficient amount of a suitable non-volatile base followed by substantially complete removal of the volatile base make possible the preparation, without isolation of the polymer, of stable concentrated solutions free of precipitated solids and especially well suited for extruding films and dry-spinning fibers. The process of this invention thus makes practical the largescale production of fibers and films with properties which would otherwise be obtainable only by more expensive processes.

Solutions of aromatic nitrogen-linked condensation polymers are conveniently made by the gradual addition of an aromatic diacid chloride or a mixture of such acid chlorides to a solution of approximately 10 weight percent of a reactive amino-compound in an amide-type solvent in such a way as to control both the reaction temperature and the physical properties of the resultant polymer. Hydrogen chloride is formed as the acid chloride reacts and forms a salt or complex with the amide-type solvent. With mixed iso-phthaloyl and tere-phthaloyl chlorides and with metaphenylenediamine as the reactive amino compound in dimethylacetamide as the amide type solvent, the resulting mixture can contain as much as about 22 percent polymer, and preferably contains about 16 to 18 percent polymer, of a fiber-forming molecular weight. At temperatures below about 30° C. up to about half of the complex between hydrogen chloride and the amide-type solvent may be insoluble in the mixture but such mixtures have viscosities suitable for further processing.

If desired, the reaction can be completed and the polymer stabilized by adding to the reaction mixture as a last stage of the reaction a slight excess of a monofunctional acid chloride, such as benzoyl chloride, or a monofunctional aromatic amine, such as aniline, to "end-cap" the polymer. The amount of such a material added can be based on the results of an acid or amine end-group analysis of the polymerization mass sampled either before or after the addition of the material in a batch or continuous process.

The polymer solutions which can be prepared in accordance with this invention are substantially linear aromatic synthetic organic nitrogen-linked condensation polymers of the general formula

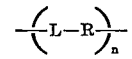

in which
(a) each —L— group, as it occurs along the polymer chain, is independently a linking group,
(b) each —R— group, as it occurs along the polymer chain, is independently an organic radical,
(c) the degree of polymerization is indicated by $n$, an integer sufficiently large to provide film-forming molecular weight, and the terminal groups of the polymer chains are not defined.

By the term "independently" is meant that each —L— or —R— group may be the same as or different from each other —L— or —R— group along the same polymer backbone chain.

"Condensation polymers" contain a backbone chain composed of alternating —L— groups and organic radical —R— groups which is formed by a condensation polymerization reaction as contrasted to a free-radical polymerization reaction. Polymers are useful which have molecular weight of sufficient magnitude so that they are film-forming or fiber-forming and have a non-tacky surface at room temperature when dry. Polymers with inherent viscosities above about 0.6 are useful and polymers with inherent viscosities of about 1.15 to about 1.5 are preferred.

"Nitrogen-linked" polymers contain nitrogen atoms in the polymer chain as linking parts of at least about 50 percent of the linking —L— groups. They can also contain other nitrogen atoms either as part of or attached to the organic radical —R— groups. Any remaining linking groups can be other functional groups formed by condensation reactions, such as ether and ester groups.

"Synthetic organic" polymers are "man-made" in the usual connotation and are composed substantially of carbon, hydrogen, oxygen, nitrogen, and sulfur. These polymers can also contain minor amounts of other atoms.

"Aromatic" polymers are polymers in which at least about 50 percent of the organic radical —R— groups contain 5-membered or 6-membered ring systems subject to resonance bonding.

"Substantially linear" polymers exhibit the general solubility and melting properties characteristic of linear polymers as contrasted to highly cross-linked polymers but can contain minor amounts of cross-linked and chain-branched structures.

The linking —L— groups in the general formula

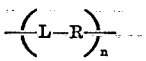

are independently chosen so that at least about 50 percent of the linking —L— groups in each polymer backbone chain contain at least one of each of the structures $$-\overset{X}{\underset{\|}{C}}- \text{ and } -\overset{}{\underset{|}{N}}-$$

in any sequence such that no one structure of either of these types is adjacent to more than one other structure of the same type.

In these polymers each "X" in the

structures can be independently oxygen or sulfur and is preferably oxygen and each "Z" in the $$-\overset{}{\underset{|}{N}}-$$

structures can be independently hydrogen, a 1 to 4 carbon alkyl, or phenyl and preferably at least one-fourth of all the Z's are hydrogen. Typical examples of nitrogen-containing linking —L— groups in this group of polymers are (a)    $-\overset{O}{\underset{\|}{C}}-\overset{H}{\underset{|}{N}}-$   (the amide group)

(b)    $-\overset{O}{\underset{\|}{C}}-\overset{O}{\underset{\|}{C}}-\overset{H}{\underset{|}{N}}-$   (the oxamide group)

(c)    $-\overset{O}{\underset{\|}{C}}-\overset{H}{\underset{|}{N}}-\overset{H}{\underset{|}{N}}-$   (the acyl hydrazide group)

(d)    $-\overset{O}{\underset{\|}{C}}-\overset{H}{\underset{|}{N}}-\overset{H}{\underset{|}{N}}-\overset{O}{\underset{\|}{C}}-$   (the diacyl hydrazide group)

(e)    $-\overset{H}{\underset{|}{N}}-\overset{O}{\underset{\|}{C}}-\overset{H}{\underset{|}{N}}-\overset{H}{\underset{|}{N}}-$   (the semicarbazide group)

It is to be understood that the structures of the above-recited linking groups are given without regard to the direction in which the structures are read, that is, these linking groups can appear both as recited and as the reverse structure in a single polymer chain. Thus the polymer structures represented by the formula

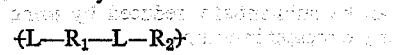

include, inter alia, all the structures

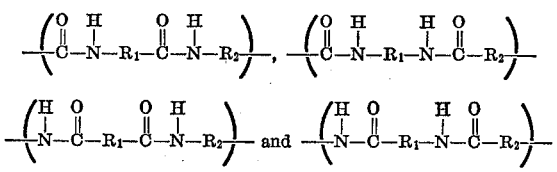

In one class of preferred polymers substantially all of the —L— groups are amide groups. The most preferred of the polyamides are those obtained by condensation of a phthaloyl chloride mixture with phenylenediamine mixtures such as mixtures containing meta-phenylenediamine and ortho-phenylenediamine or para-phenylenediamine and similar mixtures containing a derivative of a phenylenediamine such as the calcium salt of meta-phenylenediamine sulfonic acid.

Another class of preferred polymers contain the diacyl hydrazide structure

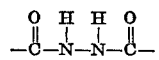

as part of all the —L— groups. Also preferred are poly(amidehydrazides) which contain both amide and hydrazide linking groups.

The organic radical —R— groups in the general formula

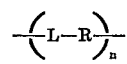

are independently chosen so that at least about 50 percent of the groups in each polymer backbone chain are aromatic radicals which can be monocarbocyclic, monoheterocyclic, fused carbocyclic, or fused heterocyclic or of the formula

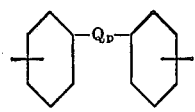

in which p is 0 or 1 and Q is a divalent group such as —CO—, —O—, —S—, —SO$_2$—, —NH—, and lower alkylene. These aromatic radicals can be unsubstituted or can have substituents which do not change the fundamental characteristics of the polymer. The preferred substituent is the sulfonic acid group.

Any remaining —R— groups can be saturated aliphatic carbocycloaliphatic or heterocycloaliphatic radicals with non-vicinal points of attachment or alkylene radicals having less than about six carbon atoms between points of attachment.

The concentrated solutions made in accordance with this invention can be composed of polymers containing repeated ‑(L—R)‑ units of a single type or of polymers containing repeated units of two or more different types. Repeat units of different types may result from the presence of different —L— groups, from the presence of different —R— groups, or from both. When the polymers contain different —L— and different —R— groups, they can be in an ordered sequence or in a more or less random sequence. The solutions can also be composed of compatible physical mixtures of polymers of any of the above-described types.

Preferably the polymers used as taught herein contain two or more different phenylene —R— groups. A particularly preferred class of polymers is those in which about 50 to 90 percent of the —R— groups are meta-phenylene groups and about 10 to 50 percent of the —R— groups are other than meta-phenylene.

Aromatic polyamides of which concentrated solutions can be prepared in practicing the present invention include those characterized by the recurring structural group

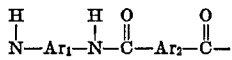

in the polymer chain, where —$Ar_1$— and —$Ar_2$— are substituted or unsubstituted divalent aromatic radicals wherein the chain-etxending bonds are oriented meta or para to each other and any substituents attached to the aromatic nucleus are not condensed with reactants during polymerization. Included are the polymers described in Kwolek et al. in U.S. Pat. 3,063,966. Wholly aromatic film- and fiber-forming polyamides of this structure may be generally prepared by the condensation of one or more aromatic diamines with one or more aromatic diacid dihalides as described by Hill et al. in U.S. Pat. 3,094,511, by Preston in U.S. Pats. 3,232,910 and 3,240,760 in British Pat. 1,104,411, and P. W. Morgan in Condensation Polymers, Polymer Review, vol. 10, Interscience Publishers, New York (1965); by self condensation of one or more aromatic amino-acid chlorides as described in French Pat. 1,526,745; or by reacting one or more aromatic aminoacid chlorides with one or more aromatic diamines and then reacting the resulting intermediate with one or more diacid chlorides. Preferably the polyamide has an inherent viscosity of about 1 to 1.5 when the determination is made with 0.5 gram of polymer in 100 milliliters of dimethylacetamide solution containing 4 grams of lithium chloride at 25° C. Magat describes in U.S. Pat. 3,184,436 the preparation of such polyamides containing sulfonic acid moities.

Aromatic polyhydrazides which can be used in practicing the present invention embrace high molecular weight aromatic condensation polymers derived from hydrazine which are film- and fiber-forming. Preferably they are characterized by the recurring structural unit

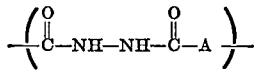

in the polymer chain, where —Ar— is a divalent aromatic radical having at least three nuclear atoms between points of attachment, at least 35 mole percent of the aromatic radicals in any polyhydrazide being other than para-phenylene radicals. Polymers with this structure include the condensation products of hydrazine or aromatic dihydrazides, e.g. a 50:50 weight ratio mixture of isophthalic dihydrazide and ethylene bis-4-benzoyl hydrazide, and a mixture of aromtaic diacid chlorides, e.g. a mixture of isophthaloyl chloride and terephthaloyl chloride. The preparation of typical polymers of this type is described by Frazer in U.S. Pat. 3,130,182 by Frazer and Wallenberger in the Journal of Polymer Science, Part A, vol. 2, pp. 1137–1145 and pp. 1147–1156 (1964), and by Frazer et al. in the Journal of Polymer Science, Part A, vol. 2, pp. 1157–1169 (1960).

Poly(amide-hydrazides) suitable for use in practicing the present invention include polymers containing both amide and hydrazide linking groups. Preferred polymers exhibiting this structure include those obtained by condensation of one or more diacid chlorides, for example a mixture of 50 to 90 percent by weight of isophthaloyl chloride and the balance terephthaloyl chloride, with a mixture of meta-phenylene-diamine with at least one dihydrazide, for example ethylene-1-(3-oxybenzoic)-2-(4-oxybenzoic) dihydrazide. A preferred polymer is the polymer synthesized from a mixture of 80 mole percent of 3-aminobenzhydrazide and 20 mole percent of 4-aminobenzhydrazide and a mixture of 70 mole percent isophthaloyl chloride and 30 mole percent terephthaloyl chloride. The preparation of such polymers is described by Culbertson and Murphy in Polymer Letters, vol. 5, pp. 807–812 (1967).

Polymers used as taught herein must be soluble in particular polar organic solvents. They are preferably soluble to at least about 10 percent by weight at 25° C. in a medium consisting essentially of 0 to 3 percent by weight of lithium chloride and a solvent selected from the group consisting of dimethylacetamide, dimethylsulfoxide, N-methylpyrrolidone, hexamethylphosphoramide, and mixtures thereof. Some polymers which are highly crystalline, such as polymers containing a high percentage of para-linked aromatic groups, are not soluble to a practical extent in any of the above solvent mixtures.

Polymerization reactions leading to polymer solutions which can be processed as described herein can be carried out in a liquid reaction medium having an average solute-solvent interaction energy with complementary model compounds representative of the polymer of less than about 1100 calories per mol as described by Kwolek et al. in U.S. Pat. 3,063,966. Such a medium can contain such solvents as methylene chloride, chloroform, tetramethylenesulfone, acetonitrile, dimethylcyanamide, and mixtures thereof. Polymer solutions processed as described herein can also contain such amounts of non-organic components, such as water, as do not cause undesirable separation of the polymer of any other component.

Spinning solutions prepared by the processes of this invention preferably contain, in the organic polar solvent for the aromatic nitrogen-linked condensation polymers, an amount of an amide-type organic compound at least sufficient to form a complex or salt with substantially all the hydrogen chloride formed in the polymerization reaction. Preferably the solvent is one or a mixture of such amide-type organic compounds. Suitable amide-type organic compounds have the formula

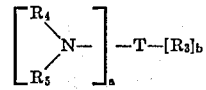

where $R_3$, $R_4$, and $R_5$ may be the same or different and are 1 to 4 carbon alkyl or alkylene radicals so chosen that the total number of carbon atoms in all of $R_3$, $R_4$, and $R_5$ is not more than 6, $a$ is 1 or 2, $b$ is 0 or 1, T is an acidic radical such as

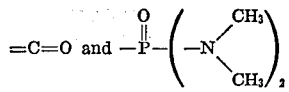

and the sum of $a+b$ is such as to satisfy the above-indicated valences of the radical T. While $R_3$, $R_4$ and $R_5$ as indicated can be separate alkyl groups, any two of these groups can be present in combination as an alkylene group, thus forming a heterocyclic ring structure. When such a heterocyclic ring is present, the ring must contain 5 or 6 nuclear atoms in all.

Typical amide-type solvents, corresponding to the above structural formula are N,N'-dimethylacetamide (T is =C=O); N,N,N',N'-tetramethylurea (T is =C=O); N-methyl-alpha-pyrrolidone (T is =C=O); and hexamethylphosphoramide, in which T is

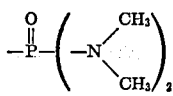

Other useful amide-type solvents include N-dimethylpropionamide, N,N-diethylacetamide, N-ethylpyrrolidone, and N,N'-dimethylbutyrmide. These amide-type solvents act as acid acceptors in the polymerization reaction and form amide complexes or salts. The preferred amide-type solvent is dimethylacetamide.

In accordance with this invention, it has been found that aromatic nitrogen-linked condensation polymer solutions, with improved stability toward viscosity changes resulting from exposure to elevated temperatures, can be prepared by adding to a solution of the polymer containing a chloride salt of a volatile nitrogenous base and, optionally, residual hydrogen chloride, an inorganic non-volatile base, which non-volatile base forms a soluble chloride salt, in an amount sufficient to convert the chloride salt of the volatile nitrogenous base and any hydrogen chloride present into the chloride salt of the non-volatile base and then substantially completely removing the volatile nitrogenous base from the mixture.

The volatile nitrogenous bases which form chloride salts which are partially soluble in polymer solutions in organic polar solvents and which are therefore useful in the processes of this invention include compounds of the type

in which $R_6$, $R_7$ and $R_8$ are independently hydrogen or alkyl groups of one to six carbon atoms, and in which the total number of carbon atoms in all the alkyl groups is six or less. The useful volatile nitrogenous bases in which $R_6$, $R_7$ and $R_8$ are hydrogen, is the preferred volatile nitrogenous base.

Mixtures of an aromatic nitrogen-linked condensation polymer, a polar organic solvent, and a partially dissolved chloride salt of a volatile nitrogenous base can be obtained in several ways. For example, the polymerization reaction mixture can contain a volatile nitrogenous base and an organic solvent, with the base serving as an acid acceptor which promotes the reaction of an acid chloride with a reactive amino-compound and forms a chloride salt which partially precipitates from the polymer solution. Preferably, hydrogen chloride present in a solution of an aromatic nitrogen-linked condensation polymer as a complex or salt of an amide-type solvent is largely precipitated as ammonium chloride by the addition of ammonia to the polymer solution. Ammonia can be added in the liquid or gaseous anhydrous form or as an aqueous ammonium hydroxide solution. Preferably ammonia is introduced into a stirred polymer solution in a continuous process. The temperature of the solution is kept below about 50° C. because of decreased ammonia solubility at higher temperatures. Ammonia addition can be continued after a significant amount of the chlorides present has been precipitated as ammonium chloride and desirably is continued until the polymer solution has a pH above at least 5.5 and preferably between about 7.5 and 9.0 as measured by standard techniques such as those involving exposure of a pH meter glass electrode to the polymer solution. The amount of ammonium chloride precipitated is reduced by any excess ammonia dissolved in the polymer solution so it is desirable before filtering to heat an ammonia-containing solution to above about 50° C. for a time sufficient to reduce the amount of ammonia dissolved. The amount of ammonium chloride precipitated is also reduced by any water present but is increased by any soluble chloride or ammonium salt, such as lithium chloride, ammonium nitrate or ammonium acetate, present in the polymer solution.

Filtration of a precipitated chloride salt of a volatile nitrogenous base from a mixture containing an amide-type solvent and more than about 14 percent of an aromatic nitrogen-linked condensation polymer is somewhat complicated by the high viscosity of the mixture. Such mixtures can be made more easily filterable by adding an inert diluent which reduces their viscosity. Useful diluents include solvents of the types described hereinabove in which chloride salts of volatile nitrogenous bases are soluble to between about 0.3 gram and about 7 grams per 100 grams of solvent. Preferred diluents include amide-type solvents as hereinbefore defined, such as dimethylacetamide and dimethylformamide which form polymer solutions in which ammonium chloride is soluble to at least about 4 percent based on the polymer present. Such diluents also increase the filterability of the mixture by dissolving ultrafine chloride salt crystals.

The optimum degree of dilution is that which produces a solution containing large salt crystals in a solution of easily filterable viscosity but containing a minimum amount of dissolved salt and of diluent which must be removed in later processing. For example, dilution of a dimethylacetamide solution containing precipitated ammonium chloride and 17 percent of a typical aromatic polyamide with an inherent viscosity of about 1.3 to a polymer concentration of less than about 12 percent, and preferably to about 10 percent, gives a solution with a viscosity of less than about 2 poise at 25° C. which contains sufficiently large ammonium chloride crystals for rapid and efficient filtration and a small enough amount of dissolved ammonium chloride and diluent for efficient subsequent processing.

Such dilute solutions with viscosities suitable for filtration can also be obtained by addition of volatile nitrogenous bases to more dilute polymerization mixtures.

Filtration to separate insoluble chloride salts from a dilute mixture containing an aromatic nitrogen-linked condensation polymer in a solvent can be by any convenient batch or continuous technique after a digestion period of less than one-half to several hours. A typical filtered solution containing about 10 percent of a typical aromatic polyamide and about 3 percent lithium chloride (based on the polymer present) in a solvent mixture containing dimethylacetamide and a small amount of water may contain about 2 to 5 percent of dissolved ammonium chloride (based on the polymer present).

Dilute solutions of aromatic nitrogen-linked condensation polymers from which precipitated chloride salts have been filtered may be useful for the wet-spinning of fibers but must be concentrated before being used for dry-spinning fibers or extruding films. Such concentration is conveniently carried out by evaporation of the solvent on a large scale in steps in two or more equipment pieces because of the large decreases in volume and increases in viscosity involved. Such concentration processes, even when carried out under vacuum, with efficient heat transfer and with efficient removal of evaporated solvent, frequently involve exposure of polymer solutions to surfaces heated, for example at 125° to 150° C. for times as long as 12 hours. It has been observed that, during such extended periods at elevated temperatures, volatile nitrogenous bases are evolved from aromatic polyamide solutions containing chloride salts of such bases, that the solutions become acidic and corrosive, and that the polymer changes in ways which affect the properties of fibers spun from the solutions. Severe reductions in polymer molecular weight has been observed in extreme cases. It has also been observed that hollow fibers spun from such solutions sometimes have porous walls such as would result from the formation of gas bubbles during the spinning process.

The non-volatile basic materials which are suitable for use in practicing this invention are those inorganic bases which are sufficiently basic to react with a chloride salt of a volatile nitrogenous base in an organic polar solvent to form an inorganic chloride salt and the volatile nitrogenous base, and which form a chloride salt which is soluble in a concentrated solution of an aromatic nitrogen-linked condensation polymer in an organic solvent. In order to be useful in evaporative concentration processes such as are described herein, these inorganic basic materials must also be less volatile than other materials which are removed from the polymer solution during evaporative concentration. While this invention is drawn to inorganic bases, it is readily seen that some organic bases could also be used.

Organic non-volatile basic materials which could be used in the process of this invention are those which are non-volatile to such an extent that a volatile nitrogenous base can be preferentially removed from a polymer solution after their addition. They would therefore have boiling temperatures at least about 30° C. and preferably more than 100° C. above the boiling temperature of the volatile base. Useful organic basic materials would include high boiling amines and preferably tertiary amines. In order to be soluble in polymer solutions and to form soluble chloride salts, such materials could contain in their structure solubilizing groups such as the hydroxyl and amide groups. If liquid, they could be used with or without dilution with a suitable solvent.

The inorganic bases useful in the process of this invention are those basic inorganic compounds which react with the chloride salt of a volatile nitrogenous base in an organic polar solvent to form the volatile base and chloride salts which are soluble in a concentrated polymer solution to the extent of at least about 2 percent and preferably over 10 percent based on the amount of polymer present. Metals which form chloride salts soluble to this extent in typical amide-type solvents include lithium, calcium, magnesium, and strontium. Of these metals lithium is preferred.

To be most practical for use in the process of this invention, inorganic basic materials should be added in solution in an inert solvent which does not precipitate any component of the polymer solution, since the reaction of the insoluble basic materials is slower and less complete. Suitable materials include the water-soluble hydroxides, bicarbonates, sulfites, sulfides, carbonates, hydrides, amide and acetates of the above-mentioned metals. Of these the carbonates, hydrides and amides are less practical and the hydroxides are the most preferred. The useful bases also include basic alkoxide derivatives of such metals, for example lithium isobutoxide.

The amount of the basic material added can be between about 90 percent and about 120 percent, and is preferably between 100 percent and 110 percent, of the amount theoretically required to convert the soluble salts of volatile nitrogenous bases present into the soluble chloride salt of the basic material and to neutralize any hydrogen chloride remaining in the solution. The basic material can be added in more than one portion and is conveniently added before or during each subsequent operation in the spinning of fibers in quantities which maintain the polymer solution during each operation at a pH between about 5.5 and about 10.0, and preferably at a pH of 7.5 to 9.0, measured as hereinbefore described. Too large an excess of the basic material should be avoided to reduce any base-catalyzed decomposition of the polymer or the amide-type solvent present in the polymer solution.

The substantially complete removal of volatile nitrogenous bases from concentrated solutions of aromatic nitrogen-linked condensation polymers in amide-type solvents can be evidenced in other ways as well as by analysis for the amount of the base present in the solution. For example, solutions which maintain relatively constant pH and/or viscosity upon extended exposure to elevated temperatures are substantially free of volatile nitrogenous bases. Similarly, the successful preparation of a concentrated solution and the dry-spinning of fibers by a procedure involving exposure of the solution to elevated temperatures for a substantial length of time is evidence of substantially complete removal of volatile nitrogenous bases.

Polymer solutions such as are described herein are considered stable toward viscosity changes during exposure to elevated temperature if they change less than 25 percent in viscosity in 24 hours at 125° C. Solution stabilities are conveniently determined by filling viscometer tubes with a polymer solution, sweeping the open ends of the tubes with nitrogen, and maintaining a slight positive nitrogen pressure upon the tubes between readings in a 125° C. constant temperature bath. Care should be taken to minimize evaporation of the solvent from the polymer solution during the stability test period.

Volatile nitrogenous bases can be substantially completely removed from polymer solutions by any of several techniques. A simple and effective procedure involves passing an inert gas through the solution at a temperature above about 50° C. under a reduced pressure to sweep out the volatile base. Evaporative concentration of a polymer solution also removes volatile bases very effectively. Volatile base removal is substantially complete when the polymer solution contains the base in an amount corresponding to a content of less than about 0.5 percent of the chloride salt, and preferably less than 0.2 percent, based on the amount of polymer present. Typical spinning solutions prepared by the process described herein contain less than 0.05 percent ammonium chloride based on the polymer present, which is less than the amount which can be accurately determined by convenient analytical procedures.

The first stage evaporation of solvents and diluents from a solution of an aromatic nitrogen-linked condensation polymer prepared as described herein can be accomplished rapidly and conveniently by heating the solution under pressure and passing the heated solution through an adiabatic expansion valve into a vacuum. Other well-known techniques, such as passage over scraped heated surfaces, can also be used. Recycle of portions of the solution may be desirable for economical commercial operation. A typical solution obtained from such an evaporation process can contain about 15 percent polymer, about 70 percent dimethylacetamide, about 5 percent soluble salts, and a small amount of water. The viscosity of such a partially concentrated solution may be 40 to 120 poise at 125° C.

The final concentration of solutions of aromatic nitrogen-linked condensation polymers for the dry-spinning of fibers is conveniently carried out in staged vacuum evaporators with wall-wiping positive displacement mixers. The final polymer concentration in a solution ready for spinning depends upon such factors as the degree of polymerization (inherent viscosity) of the polymer, the type and amount of salts present, and the solvent. Solutions containing about 18 percent to 40 percent polymer can be dry-spun. Such solutions can have viscosities between about 40 and about 2000 poise, and preferably have viscosities between 600 and 1300 poise, at 125° C.

Conventional techniques and apparatus can be used in producing fibers from spinning solutions prepared by the processes described herein. For example, hollow fibers suitable for conversion into permselective membranes can be made by extruding a heated solution of a suitable polymer through annular spinnerets of the types described by Breen et al. in U.S. 3,999,296 and by Burke et al. in U.S. Pat. 3,397,427 at temperatures between about 110° C. and about 150° C., typically between 120° C. and 130° C., at which they have suitable viscosity. A usually desirable partial drying of the spun filaments can be obtained by passing them immediately after extrusion through a heated cell through which is also passed a heated inert gas.

Extraction of salts, remaining solvents, and other materials from hollow fibers in preparing permselective membranes can be carried out continuously in connection with spinning of the hollow fibers or batchwise with packages of the spun fibers. Conveniently the fibers can be cooled and partially extracted by flooding with water imediately after passage through spinning cells and before packaging, for instance in piddle cans or on bobbins, and the extraction can be completed by passing water through the packages.

Spinning solutions of aromatic nitrogen-linked condensation polymers such as are described herein can beneficially contain chloride or bromide salts, and particularly lithium chloride, in amounts sufficient to increase the solublility of the polymer and thereby to make the solutions less sensitive to polymer gelation or precipitation during processing. Such dissolved salts also contribute to the permselective properties of membranes made from spinning solutions. These salts can be added to the spinning solutions directly at any stage of their manufacture, for example by the addition of lithium chloride.

More economically, a soluble chloride salt can be formed by the partial neutralization of hydrogen chloride formed during polymer formation by adding a suitable base to the polymerization reaction mixture containing hydrogen chloride as a salt or complex with an amide-type solvent. Suitable bases include the hydroxide, oxide, carbonate, bicarbonate, sulfite, bisulfite, sulfide, and acetate of lithium, calcium, magnesium, and strontium. The preferred bases for use in neutralizing hydrogen chloride in such processes are lithium hydroxide and lithium carbonate. Lithium hydroxide is conveniently added as a water solution and lithium carbonate is conveniently added as the solid powder.

The amount of such a base added in the process described herein is generally an amount sufficient to form a soluble chloride in an amount equivalent to between about 2 percent and about 5 percent of the amount of polymer present in the solution and is preferably sufficient to form an amount equivalent to between 2 percent and 4 percent of the amount of polymer present. More than about 10 percent lithium chloride may adversely affect the properties of fibers spun from polymer solutions containing such large amounts of salts.

Any materials desired in the fibers spun from spinning solutions prepared by the process described herein, such as delustrants, dyes, and stabilizers, are conveniently added to the partially concentrated polymer solution. In the preparation of aromatic polymer hollow fiber permselective membranes it is sometimes desirable to add a salt like lithium nitrate or lithium acetate to affect the permselective properties of the membranes obtained by extracting salts and solvent from the spun hollow fibers. Since nitrates increase the solubility of ammonium chloride in the solutions described herein, such salts are preferably added after filtration to remove precipitated ammonium chloride. The amount of lithium nitrate added is typically 10 percent to 30 percent based on the amount of polymer present and between about 15 percent and 20 percent is preferred.

The process of this invention can also include the addition to a solution of an organic solvent containing precipitated chloride salt of a volatile nitrogenous base of an inert diluent in which the chloride salt of the volatile nitrogenous base is less soluble than in the organic solvent. Such inert diluents are characterized by having (1) a solubility parameter between about 8.8 and 10.2 and preferably between 9.2 and 9.8; (2) a hydrogen bonding parameter below about 5 and preferably below about 2; and (3) a dipole moment below about 2.0 and preferably below 1.7. Preferably such inert diluents also have boiling temperatures below about 150° C., and more preferably below 65° C., so that they can easily be separated from the polymer solution by evaporation after filtration of the mixture to remove precipitated ammonium chloride. The "solubility parameter" of a diluent is the parameter defined by Hildebrand and Scott in "The Solubility of Nonelectrolytes," third edition, Reinhold, New York (1949). The "hydrogen bonding parameter" of a diluent is the parameter measured by Gordy et al. in the Journal of Chemical Physics, vol. 9, pages 204 to 214 (1941), using the shift in the wave number of the infrared stretching vibration of the oxygen-deuterium bond when deutero-methanol interacts with the diluent in benzene solution. By "dipole moment" is meant the well-known property of materials reflecting the distances of separation of their inherent electrical charges. Crowley et al. summarize these properties for a large list of solvents in the Journal of Paint Technology, vol. 38, No. 496, pages 269 to 280 (1966). Table I lists values of solubility parameter, hydrogen bonding parameter, and dipole moment from the table of Crowley et al. for some of the inert diluents which are useful in the processes described herein. Methylene chloride is the preferred inert diluent because of its low cost, low flammability, and low toxicity.

TABLE I

| Inert diluent | Solubility parameter | Hydrogen bonding parameter | Dipole moment | Boiling point, °C. |
|---|---|---|---|---|
| Chloroform | 9.3 | 1.5 | 1.2 | 61.3 |
| Carbon tetrachloride | 8.6 | 0 | 0 | 76.8 |
| Methylene chloride | 9.7 | 1.5 | 1.5 | 40.1 |
| 1,2-dichloroethane | 9.8 | 1.5 | 1.1 | 84 |
| Benzene | 9.2 | 0 | 0 | 80 |
| Toluene | 8.9 | 4.5 | 0.4 | 110.6 |
| Xylene (commercial) | 8.8 | 4.5 | 0.4 | 140 |
| Chlorobenzene | 9.5 | 1.5 | 1.6 | 131 |

Such an inert diluent can be added in any amount which does not cause precipitation of the polymer. Diluents which reduce the solubility of ammonium chloride in solutions of aromatic nitrogen-linked condensation polymers are characteristically inefficient solvents for such polymers. The amount and rate of addition of such a diluent to a polymer solution to reduce the solubility of ammonium chloride are therefore limited by the tendency of the polymer to precipitate from the mixture. The diluent is preferably added slowly to a stirred solution to avoid polymer precipitation. A typical aromatic polyamide in dimethylacetamide containing about 4 percent lithium chloride (based on the polymer present) can be diluted with methylene chloride from a polymer concentration of about 17 percent to a polymer concentration of about 5 percent before polymer precipitation occurs upon storage of the mixture. Dilution to a polymer concentration of about 6 to 7.5 percent is preferred. Other aromatic polyamides precipitate upon dilution to concentrations less than about 10 percent. Such solutions have after dilution a viscosity suitable for filtration to remove precipitated amonium chloride.

To summarize the process described herein for preparing spinning solutions of aromatic nitrogen-linked condensation polymers, the steps involved in their preferred sequence are listed below, with the essential steps of the process numbered and the optional steps lettered:

(1) Preparation of a polymer solution in a suitable solvent by condensation of one or more aromatic dibasic acid chlorides with one or more reactive diamino compounds to form a polymer and hydrogen chloride.

(A) Optionally, partial neutralization of the hydrogen chloride with a base to form a soluble chloride salt which may increase the solubility of the polymer during subsequent processing.

(2) Addition of a volatile nitrogenous base to cause precipitation of substantial amounts of the chloride salt of the base.

(B) Optionally, dilution of the polymer solution containing precipitated chloride salt with a diluent which reduces the viscosity of the solution and also either dissolves ultrafine salt crystals or reduces the solubility of the salt.

(3) Filtration to separate the precipitated chloride salt of the volatile nitrogenous base from the polymer solution.

(4) Basification with a solution of a non-voltaile inorganic base to convert soluble salts of the volatile nitrogenous base into other soluble salts and to regenerate the voltaile base.

(C) Optionally, evaporation to remove a substantial amount of the diluent and solvent from the polymer solution.

(D) Optionally, addition of materials which are beneficial during later processing steps or contribute to the properties of the product made from the solution.

(5) Substantially complete removal of the voltaile nitrogenous base.

(E) Optionally, concentration to remove sufficient solvent to obtain a solution suitable for further processing.

The following examples illustrate this invention. The parts of materials recited therein are by weight unless otherwise indicated. The percentages of polymers in solutions are based on the total weights of the solutions. The percentages of salts and other materials present in polymer solutions are based on the weights of polymers in the solutions unless otherwise indicated. Polymer inherent viscosities are determined with 0.5 gram of polymer in a solution of 4 grams of lithium chloride in 100 milliliters of dimethylacetamide unless otherwise indicated.

EXAMPLE I

To a stirred and cooled staged continuous polymerization vessel was added, continuously and at substantially stoichiometric rates, (a) a cooled solution in dimethylacetamide of a mixture of 80 parts of metaphenylenediamine and 20 parts of the calcium salt of metaphenylenediamine-4-sulfonic acid and (b), in three separate streams, a molten mixture of 70 parts of isophthaloyl chloride and 30 parts of terephthaloyl chloride. After a residence time of about 6 minutes at a temperature of about 40° C., into the resulting polymerization mixture in the reaction vessel was introduced sufficient benzoyl chloride to reduce the amine end group analysis of the polymer to below about 2 milliequivalents of amine ends per kilogram of polymer in order to "end-cap" the polymer. The resulting mixture contained about 17.5 percent of an aromatic polyamide in an amide-type solvent along with a partially dissolved complex of hydrogen chloride and dimethylacetamide. The inherent viscosty of the polymer was about 1.2.

Sufficient lithium carbonate to produce about 3 percent lithium chloride was added to the polymerization mixture in a stirred vessel. Anhydrous ammonia was then passed into the patrially neutralized polymer mixture until the mixture had a pH of about 9.0 as measured with a glass electrode. The mixture now contained partially dissolved ammonium chloride. The neutralized polymer solution was diluted with methylene chloride to a polymer concentration of about 7.5 percent. After a period of digestion and crystal growth, the resulting mixture was filtered to remove precipitated ammonium chloride. The resulting polymer solution contained about 1 percent dissolved ammonium chloride.

To the filtered polymer solution was added a 10 percent aqueous solution of lithium hydroxide in an amount about 10 percent in excess of that required to convert all the ammonium chloride present to lithium chloride. The resulting mixture was heated to about 115° C. and passed through an adiabatic expansion valve to evaporate ammonia, methylene chloride, water, and a small amount of dimethylacetamide. The resulting solution contained 16.8 percent polymer and had a pH near 7. Sufficient aqueous lithium hydroxide was added to obtain a pH of 8.0 to 8.5, and the solution was heated to about 130° C. and passed through an adiabatic expansion valve into an evacuated chamber. The resulting more concentrated solution contained 24.9 percent polymer with an inherent viscosity of about 1.2. The solution also contained calcium equivalent to 0.55 percent calcium chloride; lithium equivalent to 3.6 percent lithium chloride; ammonium salts equivalent to 0.13 percent ammonium chloride; 125 parts per million of ferric iron compounds; 1.4 percent sulfur; 0.006 percent water (based on the total weight of the solution); and 1.7 percent methylene chloride. This solution was mixed with other similar solutions to obtain a volume large enough for spinning.

Lithium nitrate equivalent to about 15 percent of polymer present was added to the mixture of partially concentrated solutions in a stirred vessel. To the resulting mixture was added a 10 percent aqueous solution of lithium hydroxide in an amount sufficient to give a pH of 8.0 to 8.5. The mixture was then passed continuously through a stirred vacuum evaporation vessel to remove more ammonia, water, and methylene chloride and sufficient dimethylacetamide to obtain a solution containing about 3.7 percent lithium chloride and about 29.5 percent polymer with an inherent viscosity of about 1.2. The concentrated solution had a viscosity of about 750 poise at 125° C. and contained ammonia near the detectable limit of the analytical procedure used.

The concentrated solution was spun through a spinneret of 150 annular holes of the type described by Burke et al. in U.S. Pat. 3,397,427. A normal slight rise in pressure on the spinneret was observed during about four hours of spinning at a solution temperature of about 135° C. The spun fibers were passed through a 19-foot by 9-inch cell maintained at about 160° C. and supplied with an inert aspiration drying gas at about 170° C. The fibers emerging from the cell, from which the solvent had partially evaporated, were quenched in water at near ambient temperature and piddled at a rate of about 76 yards per minute into a container while water was continuously sprayed into the container. Water was then passed through the container for about 23 hours to reduce the dimethylacetamide content of the fibers to less than about 1 percent. The water extracted hollow fibers had an average outside diameter of 85.5 microns and an average inside diameter of 43.8 microns, corresponding to 26.3 percent hollow. They were kept wet with water until used as permeation separation membranes.

Miniature permeators were assembled with a single loop (300 filaments) of these product fibers having an active fiber length of 33 inches. In tests at 410 pounds per square inch with a solution containing 1500 parts per million of sodium chloride, these permeators had a water permeability of 1.83 gallons per square foot per day and a salt passage of 6.4 percent.

EXAMPLE II

To 96.9 parts of the partially concentrated polymer solution of Example I containing 24.9 percent polymer was added 3.6 parts of lithium nitrate (equivalent to 15 percent lithium nitrate) and 19.7 parts of dimethylacetamide. The resulting solution was concentrated under a vacuum of 0.5 to 1 torr at 65° C. to 70° C. for the removal of sufficient ammonia, water, methylene chloride and dimethylacetamide to obtain a solution containing 30.78 percent polymer. This concentrated solution had a viscosity of 765 poise at 125° C. After 23 hours at 125° C. the solution had a viscosity of 866.3 poise at 125° C. This solution increased 13.4 percent in 125° C. viscosity in 23 hours thereby showing sufficient stability for use in dry-spinning fibers.

EXAMPLE III

A polymerization mixture was prepared as in Example I except that it contained about 22 percent polymer. This mixture was partially neutralized with lithium carbonate equivalent to about 3 percent lithium chloride and then neutralized with anhydrous ammonia to a pH of about 9.0. The resulting solution was diluted with dimethyl acetamide to about 8 percent polymer and filtered to remove precipitated ammonium chloride, thereby obtaining a solution of an aromatic polyamide in an amide-type solvent containing a small amount of dissolved ammonium chloride.

To the resulting solution was added a 10 percent aqueous solution of lithium hydroxide in an amount equivalent to an excess of about 20 percent over that required to convert the ammonium salts present to ammonia and lithium chloride. The solution was then heated and partially evaporated and then reheated and further evaporated as in Example I to obtain a solution containing 25.7 percent polymer with an inherent viscosity of about 1.2; calcium equivalent to 0.42 percent calcium chloride; lithium equivalent to 4.87 percent lithium chloride; ammonium salts equivalent to 0.33 percent ammonium chloride; chlorides equivalent to 5.21 percent lithium chloride; 236 parts per million of ferric iron compounds; 0.009 percent water (based on the total weight of the solution); and 1.4 percent sulfur.

To this solution was added 20 percent lithium nitrate and a 10 percent aqueous solution of lithium hydroxide in an amount sufficient to give a pH of 8.0 to 8.5. The resulting solution was then further concentrated as in Example I to obtain a solution with a viscosity of 750 poise at 125° C. containing 29.5 percent polymer with an inherent viscosity of about 1.2 and ammonia near the detectable limit of the analytical procedure used. This concentrated solution was spun under the conditions of Example I with no significant increase in the spinneret pressure. The spun fibers were quenched and rinsed with water at a temperature of 19° C. as in Example I to obtain fibers with an average outside diameter of 85.4 microns and an average inside diameter of 39.8 microns, corresponding to a percent hollow of 21.7. These fibers were kept wet with water until used as permeation separation membranes.

Miniature permeators were made with these fibers as in Example I. In reverse osmosis tests under the conditions of Example I, these permeators had a water permeability of 1.87 gallons per square foot per day and a salt passage of 7 percent.

EXAMPLE IV

To 105.1 parts of the partially concentrated polymer solution of Example III containing 25.7 percent polymer was added 4.1 parts of lithium nitrate (equivalent to 15 percent lithium nitrate) and 27.5 parts of dimethylacetamide. The resulting solution was concentrated under a vacuum of 0.5 to 1 torr at 65° C. to 70° C. for removal of sufficient ammonia, water, and dimethylacetamide to obtain a solution containing 31.24 percent polymer. This concentrated solution had a viscosity of 1580 poise at 125° C. After 48 hours at 125° C. the solution had a viscosity of 1904 poise at 125° C. This solution increased 21 percent in viscosity in 48 hours, thereby showing sufficient stability for use in dry-spinning fibers.

EXAMPLE V

To a mixture of 9.07 parts of para-aminobenzhydrazide and 36.28 parts of meta-aminobenzhydraizde in 955 parts of dimethylacetamide at a temperature of −10° C. to −15° C. was added slowly 60 parts of a molten mixture of 70 parts of isophthaloyl chloride and 30 parts of terephthaloyl chloride. Gaseous trimethylamine was also passed into the mixture at a rate which maintained the reaction mixture at a pH near 3.5. The rates of addition were reduced as the mixture thickened after about one hour. To the resulting mixture was added 2 grams of benzoyl chloride and, after about 10 minutes, one gram of water. Trimethylamine addition was continued until the mixture had a pH of 8.2. The mixture was stirred overnight and then filtered to remove precipitated trimethylamine hydrochloride. There was thus obtained a solution of an aromatic poly(amide-hydrazide), having an inherent viscosity of 0.71 in dimethylacetamide in a polyamide solvent containing a soluble small amount of the hydrochloride of a volatile nitrogenous base.

To one-third of the filtered polymer solution was added 11.2 parts of a solution of 10 parts of lithium hydroxide hydrate in 100 parts of water. The resulting solution was evaporated under vacuum, removing trimethylamine, water, and dimethylacetamide, to obtain a solution containing about 15 percent polymer.

To a first portion of the concentrated polymer solution was added lithium chloride sufficient to provide 6.9 percent lithium chloride. The resulting solution had a pH of 4.2 and a viscosity of 0.915 poise at 125° C. After 24 hours at 125° C. this solution had a viscosity of 0.74 at 125° C. The 125° C. viscosity of this solution was reduced about 19 percent after 24 hours and 25 percent after 35 hours at 125° C. The solution had a pH of 4.5 after 48 hours at 125° C.

To a second portion of the concentrated polymer solution was added lithium chloride sufficient to provide 6.9 percent lithium chloride; lithium nitrate sufficient to provide 30 percent lithium nitrate; and sufficient of a solution of 10 parts of lithium hydroxide hydrate in 100 parts of water to provide 0.2 percent lithium hydroxide and 1.8 percent water. The resulting solution had a pH of 8.0 and a viscosity of 0.95 poise at 125° C. After 24 hours at 125° C. this solution had viscosity of 0.94 poise at 125° C. The viscosity of this solution was reduced about 10 percent after 24 hours and 23 percent after 48 hours at 125° C. This solution had a pH of 6.7 after 48 hours at 125° C.

EXAMPLE VI

To a mixture of 12.34 parts of the calcium salt of metaphenylenediamine-4-sulfonic acid, 21.08 parts of metaphenylene diamine, and 9.01 parts of 4,4'-diaminodiphenyl ether in 821 parts of dimethylacetamide at 0° C. to 2° C. was added slowly 61.51 parts of a molten mixture of 70 parts of isophthaloyl chloride and 30 parts of terephthaloyl chloride. The mixture was warmed to 30° C. before addition of the last portions of the phthaloyl chloride mixture. To the resulting mixture was added 0.714 part of magnesium oxide and then gaseous ammonia was passed through the mixture until the pH remained at about 9 for one hour. To the resulting mixture was added 739 parts of methylene chloride and the mixture was filtered to remove precipitated ammonium chloride. There was thus obtained a solution of an aromatic polyamide containing ether oxygen (—O—) linking groups in an organic polar solvent containing a soluble small amount of ammonium chloride, the hydrochloride of a volatile nitrogenous base. The polymer had an inherent viscosity of 0.78 in dimethylacetamide.

To this solution was added 6.75 parts of a solution of 10 parts of lithium hydroxide hydrate in 100 parts of water. The resulting solution was evaporated under vacuum, removing ammonia, methylene chloride, water, and dimethylacetamide, to obtain a solution containing 15 percent polymer.

The concentrated solution, which contained one percent lithium chloride and 1.2 percent magnesium chloride, had a pH of 6.9 and a viscosity of 2.7 poise at 125° C. After 24 hours at 125° C. the solution had a viscosity of 2.8 poise at 125° C. The viscosity of this solution increased 4 percent during 24 hours and 13 percent after 48 hours at 125° C. The solution had a pH of 6.4 after 48 hours at 125° C.

A permselective membrane was made from this solution by casting a film of the solution at a thickness of 15 mils onto a plate at 100° C., holding the plate at 100° C. for four minutes, and immersing the film and the plate in cool water. In reverse osmosis desalination tests at 1000 pounds per square inch pressure with a synthetic sea water this membrane had a water flux of 0.70 gallon per square foot per day and a salt passage of 2.7 percent. The synthetic sea water was prepared by dissolving 7700 grams of sea salt (Lake Products Co., St. Louis, Mo.), 50 milliliters of 37 percent hydrochloric acid, 50 milliliters of 45 percent sodium hydroxide, and 50 milliliters of a 1 percent solution of commercial-grade calcium hypochlorite in 50 gallons of deionized water. The solution was adjusted to pH 8.0 with hydrochloric acid or sodium hydroxide as needed.

To a portion of the concentrated polymer solution was added sufficient lithium nitrate to provide 20 percent lithium nitrate. The resulting solution had a pH of 6.9 and a viscosity of 2.7 poise at 125° C. After 24 hours at 125° C. the solution had a viscosity of 2.9 poise at 125° C.

The viscosity of the solution increased 8 percent during 24 hours and 14 percent during 48 hours at 125° C. This solution had a pH of 5.1 after 48 hours at 125° C.

A permselective membrane was made from the solution containing lithium nitrate as described above. This membrane had a water flux rate of 3.8 gallons per square foot per day and a salt passage of 6.8 percent in reverse osmosis desalination tests performed as described above.

Other inorganic bases such as calcium, magnesium and strontium bases and other lithium bases such as lithium carbonate, lithium isobutoxide, lithium bicarbonate and others can be substituted for the lithium hydroxide in the above examples with results similar to those obtained above.

The values reported in the above examples for water-flux and solute passages were determined in accordance with the following equations. In reverse osmosis systems operated at a fixed pressure, $$\text{water flux} = \frac{\text{gallons of water permeate}}{\text{days} \times \text{square feet}}$$

expressed in gallons per square foot per day. The square feet of membrane used in the calculation is based on the surface area exposed to the feed water. In the case of hollow fiber membranes, the surface area is the area of the outer fiber wall as expressed by the equation $$\text{square feet} = \text{pi} \times D \times L$$

where D is the outside diameter of the hollow fiber membrane in feet and L is the length in feet of fiber exposed to the feed water.

The percent solute passage is defined as

Percent solute passage $$= \frac{\text{concentration of solute in permeate}}{\text{concentration of solute in feed}} \times 100$$

The concentrations of salts in permeates and feeds may be determined conductometrically or by chemical analysis.

The embodiments of the invention in which an exclusive property or privilege is claimed are as follows:

1. In a process for preparing a polymer solution for the dry-spinning of fibers or the extrusion of films, by reacting an aromatic diacid chloride or a mixture of such acid chlorides with a reactive amino compound whereby by-product hydrogen chloride is generated, and comprising the steps of
    (A) preparing a mixture comprising
        (I) a solution of
            (a) a substantially linear aromatic synthetic organic nitrogen-linked polymer having an inherent viscosity greater than 0.6 and a formula

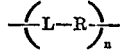

wherein
                (i) each —L— group as it occurs in the polymer chain is independently a linking group and at least about 50 percent of the —L— groups contain nitrogen atoms in the polymer chain;
                (ii) each —R— group as it occurs in the polymer chain is independently an organic radical and at least about 50 percent of the —R— groups consist essentially of a 5-member or a 6-member ring subject to resonance bonding; and
                (iii) the degree of polymerization is defined by $n$, with the terminal groups undefined; and
            (b) an organic polar solvent which is
                (i) a solvent for the polymer,
                (ii) a partial solvent for the chloride salt of a nitrogenous base of the formula

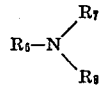

wherein $R_6$, $R_7$ and $R_8$ are the same or different and are hydrogen or alkyl of 1 to 6 carbon atoms with the limitation that the total number of carbon atoms in $R_6$, $R_7$ and $R_8$ is less than 7,
                (iii) a solvent for the chloride salt of an inorganic base, and
            such that the nitrogenous base can be removed from the polymer solution; and
        (II) the chloride salt of the nitrogenous base, in an amount such that a portion is soluble and a portion is insoluble in the polymer solution; and
    (B) separating the insoluble portion of the chloride salt from the mixture
the improvement which consists essentially of the steps of
    (C) adding to the mixture, after the separation of step B, the inorganic base, which base forms a chloride salt soluble in a concentrated solution of the polymer in the organic polar solvent, said base being added in an amount sufficient to convert any hydrogen chloride present and the soluble portion of the salt of the nitrogenous base to soluble chloride salts of said inorganic base; and
    (D) removing substantially all of the nitrogenous base from the resulting solution.

2. A process of claim 1 in which
    (A) the polymer has an inherent viscosity of from about 1.15 to about 1.5, at least about 50 percent of the —L— groups contain one each of a structure selected from

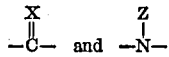

wherein
        X is oxygen or sulfur, and
        Z is hydrogen, alkyl of 1 to 4 carbon atoms or phenyl
    and the —R— groups are phenylene groups;
    (B) the organic polar solvent has the formula

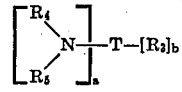

wherein
        $R_3$, $R_4$ and $R_5$ are the same or different and are alkyl of 1 to 4 carbon atoms or alkylene of 1 to 4 carbon atoms with the provision that any two of $R_3$, $R_4$ and $R_5$ can be joined to give a heterocyclic ring of 5 to 6 atoms, and with the limitation that the total number of carbon atoms in $R_3$, $R_4$ and $R_5$ is less than 7;
        T is an acid radical;
        $a$ is 1 or 2;
        $b$ is 0 or 1,
        with the limitation that the sum of $a$ and $b$ is sufficient to satisfy valences of the radical T;
    (C) the volatile nitrogenous base is a compound of the formula

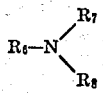

wherein $R_6$, $R_7$ and $R_8$ are the same or different and are hydrogen or alkyl of 1 to 6 carbon atoms with the limitation that the total number of carbon atoms in $R_6$, $R_7$ and $R_8$ is less than 7; and (D) the non-volatile inorganic base is a hydroxide, carbonate, bicarbonate, sulfite, sulfide, hydride, amide, acetate or alkoxide of lithium, calcium, magnesium or strontium, added in amounts sufficient to maintain a pH between 5.5 and 10.

3. A process of claim 2 in which
(A) substantially all of the —L— groups in the polymer are amides, diacyl hydrazides or their mixtures, and the —R— groups in the polymer consist essentially of 50 to 90 percent meta-phenylene groups;
(B) the organic polar solvent is dimethylacetamide, dimethylsulfoxide, N-methylpyrrolidone, hexamethylphosphoramide or their mixtures;
(C) the volatile nitrogenous base is ammonia, triethylamine or trimethylamine;
(D) the inorganic base is a lithium base, added in amounts sufficient to maintain a pH between about 7.5 and 9.

4. A process of claim 3 in which
(A) the polymer is a polyamide obtained by condensation of a phthaloyl chloride mixture with phenylenediamine mixtures;
(B) the organic polar solvent is dimethylacetamide;
(C) the volatile base is ammonia; and
(D) the inorganic base is lithium hydroxide.

References Cited

UNITED STATES PATENTS

| | | | |
|---|---|---|---|
| 3,063,966 | 11/1962 | Kwolek | 260—78 |
| 3,600,350 | 8/1971 | Kwolek | 260—32.6 |
| 3,068,188 | 12/1962 | Beste | 260—30.2 |
| 3,575,933 | 4/1971 | Hoegger | 260—78 |
| 3,632,548 | 1/1972 | Preston | 260—32.6 |

ALLAN LIEBERMAN, Primary Examiner

R. ZAITLEN, Assistant Examiner

U.S. Cl. X.R.

260—30.8 DMSO, 78 R

PO-1050
(5/69)

UNITED STATES PATENT OFFICE
CERTIFICATE OF CORRECTION

Patent No. 3,775,361      Dated November 27, 1973

Inventor(s) James Henry Jensen

It is certified that error appears in the above-identified patent and that said Letters Patent are hereby corrected as shown below:

The portion of Claim 2 beginning at column 20, line 65 with "the volatile nitrogenous base" to the end of the column should be deleted.
At column 21, line 1, strike "(D)"; line 1, strike "non-volatile".

Column 3, line 53, delete "and" and following the semi-color insert - (b) an organic polar solvent; and -

Column 7, line 5, insert a bond at the extreme left side of the formula such that is reads Column 7, line 58, substitute - 1964 - for "1960".

Signed and sealed this 23rd day of April 1974.

(SEAL)
Attest:

EDWARD M.FLETCHER,JR.
Attesting Officer

C. MARSHALL DANN
Commissioner of Patents